(12) United States Patent
Miura et al.

(10) Patent No.: US 6,629,091 B1
(45) Date of Patent: Sep. 30, 2003

(54) SYSTEM AND A METHOD FOR A DATABASE SEARCH, AND A MEDIUM FOR STORING DATABASE SEARCHING PROGRAMS

(75) Inventors: Iwao Miura, Kawasaki (JP); Youko Sakaki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/301,620

(22) Filed: Apr. 29, 1999

(30) Foreign Application Priority Data

Aug. 25, 1998 (JP) ............................. 10-238307

(51) Int. Cl.[7] .............................................. G06F 17/30
(52) U.S. Cl. ..................... 707/2; 707/3; 707/4; 707/10; 707/102
(58) Field of Search ............................... 707/1–10, 501, 707/100–102, 103, 104.1; 709/200–203

(56) References Cited

U.S. PATENT DOCUMENTS 5,550,971 A * 8/1996 Brunner et al. ............. 395/161
5,701,460 A * 12/1997 Kaplan et al. ................. 707/3
5,748,188 A * 5/1998 Hu et al. ...................... 345/326

OTHER PUBLICATIONS

Koch et al., ORACLE The Complete Reference Third Edition, 1995, Oracle Press, pp. 215–217, 221–223, and 231–234.*

* cited by examiner

Primary Examiner—Kim Vu
Assistant Examiner—Joon Hwan Hwang
(74) Attorney, Agent, or Firm—Staas & Halsey LLP

(57) ABSTRACT

A database search system searches a database through a network. The database reduces the load maintained in a server, and allows users of a client terminal to direct the search condition and to change the method for displaying a list of the search results. Database information and search information are included in a hypertext part defining a screen for the search. A CGI processing part generates automatically a database search sentence (an SQL sentence) based on the information described in the hypertext part. A screen input control part includes a function editing by a graphical user interface the hypertext source defining a screen in the client terminal.

6 Claims, 20 Drawing Sheets

EXAMPLE OF INTERMEDIATE

| | ORIGINAL TABLE NAME | END TABLE NAME | LINK TABLE NAME | LINK CONDITION |
|---|---|---|---|---|
| ① | TECT | IPPANT | | TECT.ZUB = IPPANT.ZUB |
| ② | TECT | RANKT | IPPANT | TECT.ZUB = IPPANT.ZUB<br>IPPANT.KAI = RANT.KAI |
| ② | TECT | SOURCET | IPPANT | TECT.ZUB = IPPANT.ZUB<br>IPPANT.KAI = SOURCET.KAI |
| ① | IPPANT | TECT | | IPPANT.ZUB = TECT.ZUB |
| ① | IPPANT | RANKT | | IPPANT.KAI = RANKT.KAI |
| ① | IPPANT | SOURCET | | IPPANT.KAI = SOURCE.KAI |
| ② | RANKT | TECT | IPPANT | RANKT.KAI = IPPANT.KAI<br>IPPANT.ZUB = TECT.ZUB |
| ① | RANKT | IPPANT | | RANKT.KAI = IPPANT.KAI |
| ① | RANKT | SOURCET | | RANT.KAI = SOURCET.KAI |
| ② | SOURCET | TECT | IPPANT | SOURCET.KAI = IPPANT.KAI<br>IPPANT.ZUB = TECT.ZUB |
| ① | SOURCET | IPPANT | | SOURCET.KAI = IPPANT.KAI |
| ① | SOURCET | RANKT | | SOURCET.KAI = RANKT.KAI |

①: 1ST. ORDER LINK RELATION
②: 2ND ORDER LINK RELATION

FIG. 3

SCREEN OF SEARCH DIRECTION

33

BROWSER SCREEN (SEARCH)

33-1

| MEMBER NAME | ORDER | CONTENTS OF SEARCH |
|---|---|---|
| KK_00K03 | SPECIFICATION → | FUNCTION CN364 FIGURE NUMBER, DESIGNER |

33-2

ORDER SPECIFICATION: C76L-0420-0002

33-3

| POSSIBLE OF FOLLOWING OPTION SET IN SEARCHING | | |
|---|---|---|
| CLASSIFICATION | SET VALUE (DEFAULT) | EXPLANATION |
| OUTPUT REPRESENTATION METHOD | TEXT FORM ▼ | DIRECTING OUTPUT FORMATION FORM |
| SHOWING MAX. CASE NUMBER | 100 | DIRECTING FOR SHOWING DATA CASE NUMBER OF SEARCH RESULT LIST, OR SHOWING ONLY MAX. CASE NUMBER IN CASE OVER DIRECTED CASE NUMBER |
| FILE OUTPUT OF CSV FORM | NO OUTPUTTING ▼ | OUTPUT OF CSV FORM FILE (SEARCH RESULT) |

[ SEARCH ]  [ CLEAR ]  [ ITEM EDITION ]

FIG. 4

HTML SOURCE OF SCREEN FOR SEARCH DIRECTION

```
<!----DESCRIPTION OF SEARCH DIRECTION---->
<!---->
<!---->
<FORM NAME="SEARCH_FORM" METHOD="POST">
<INPUT TYPE="HIDDEN" NAME="MODE" VALUE="1">
<INPUT TYPE="HIDDEN" NAME="INF1" VALUE="KK_00K03">
<INPUT TYPE="HIDDEN" NAME="INF2" VALUE="ORDER SPECIFICATION → FUNCTION, CN364 FIGURE NUMBER, DESIGNER">
<INPUT TYPE="HIDDEN" NAME="TGNAME" VALUE="KANI">
<INPUT TYPE="HIDDEN" NAME="TNAME" VALUE="K03">
<INPUT TYPE="HIDDEN" NAME="DATACNT" VALUE="6">
<TABLE BORDER=0 CELLSPACING=3>
<TR><TD>ORDER SPECIFICATION</TD>
<TD> : <INPUT TYPE="TEXT" SIZE=30 NAME="SOURCET.TEH:1:1:1" VALUE="C76L-0420-0002"></TD>
<TD><BR></TD>
</TR>
</TABLE><P>
<INPUT TYPE="HIDDEN" NAME="IPPANT.KINO:0:2:-1">
<INPUT TYPE="HIDDEN" NAME="IPPANT.ZUB:0:3:-1">
<INPUT TYPE="HIDDEN" NAME="RANKT.KBAN:0:4:-1">
<INPUT TYPE="HIDDEN" NAME="TEC1.SEK:0:5:-1">
<INPUT TYPE="HIDDEN" NAME="TEC1.SKA:0:6:-1">
<BLINK>
```

NAME="TABLE NAME OF SEARCH CONDITION.FIELD NAME; SEARCH CONDITION FLAG; ITEM LIST FLAG; SORT ITEM FLAG"

NAME="TABLE NAME OF SEARCH ITEM.FIELD NAME; SEARCH CONDITION FLAG; ITEM LIST FLAG; SORT ITEM FLAG"

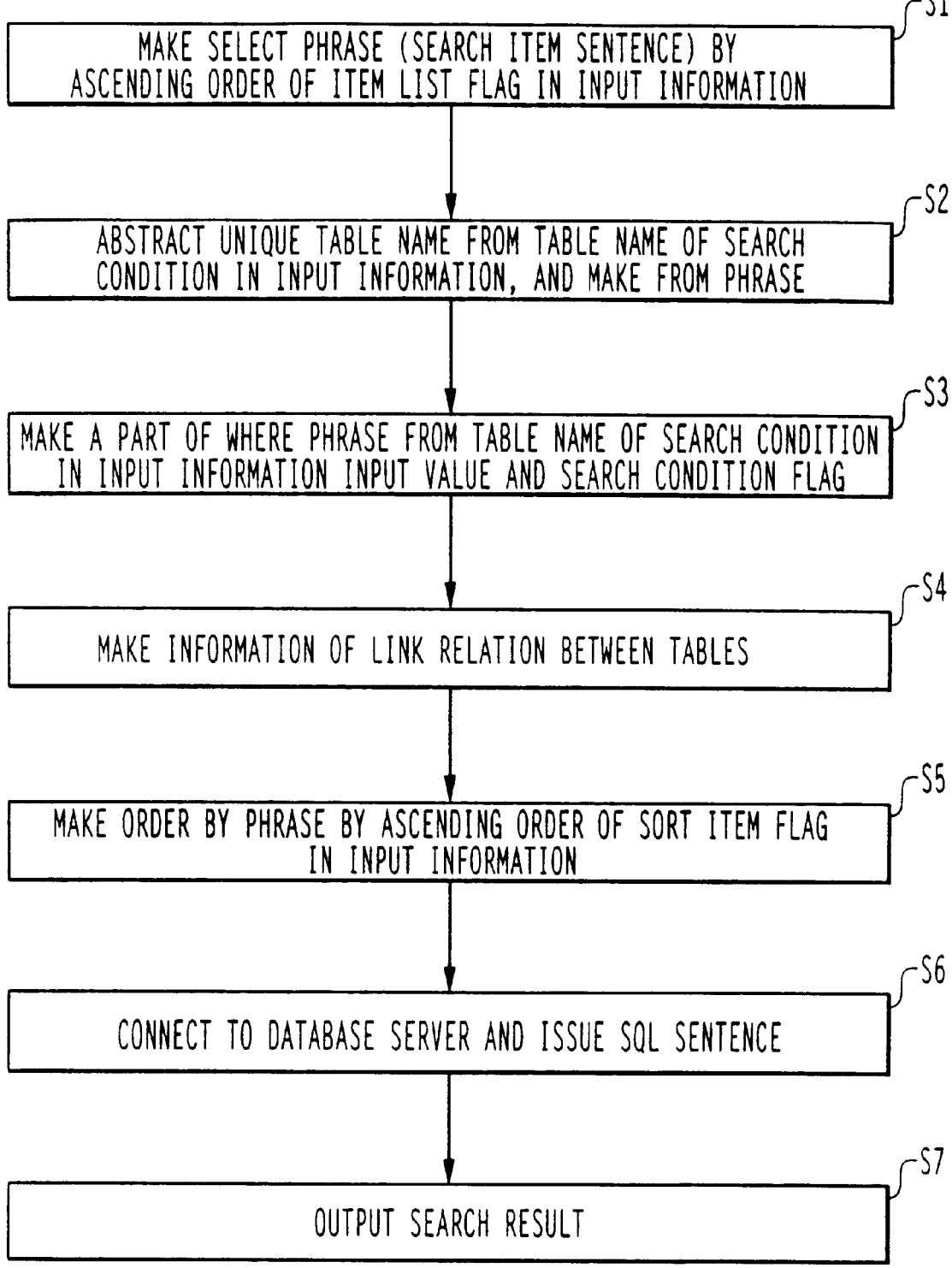

FIG. 6
EXAMPLE OF CREATED SENTENCE

```
① SELECT SOURCET.TEH, IPPANT.KINO, IPPANT.ZUB, RANKT.KBAN, TECT.SEK, TECT.SKA
② FROM   SOURCET, IPPANT, RANKT, TECT
③ WHERE  SOURCET.TEH='C76L-0420-0002' AND
         SOURCET.KAI=RANKT.KAI AND RANKT.KAI=IPPANT.KAI AND IPPANT.ZUB=TECT.ZUB
④ ORDER BY SOURCET.TEH;
⑤
```

FIG. 7A
LINK RELATION
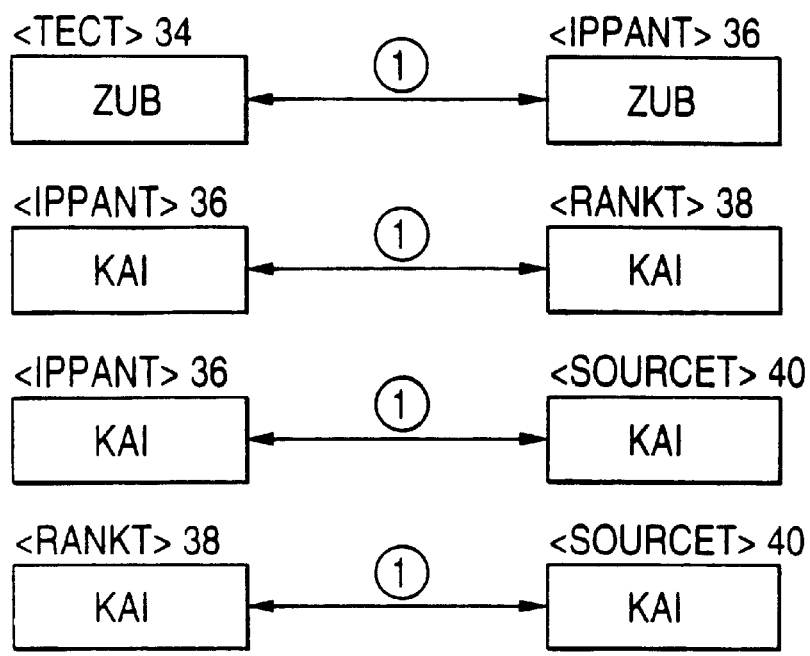
FIG. 7B
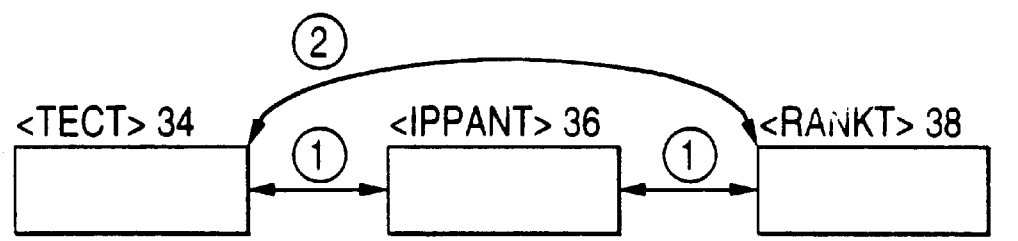
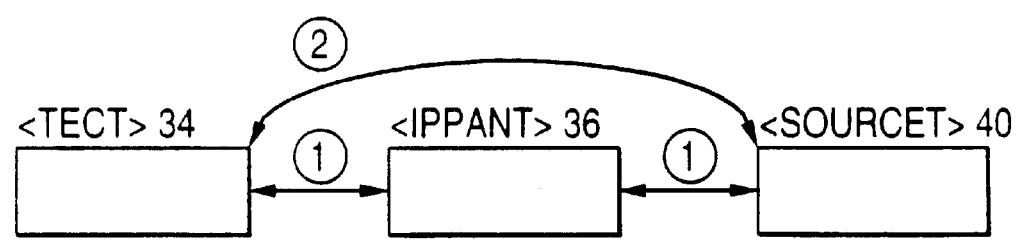
① 1ST. ORDER RELATION
② 2ND ORDER RELATION

FIG. 8
EXAMPLE OF INTERMEDIATE

| | ORIGINAL TABLE NAME | END TABLE NAME | LINK TABLE NAME | LINK CONDITION |
|---|---|---|---|---|
| ① | TECT | IPPANT | | TECT.ZUB = IPPANT.ZUB |
| ② | TECT | RANKT | IPPANT | TECT.ZUB = IPPANT.ZUB<br>IPPANT.KAI = RANT.KAI |
| ② | TECT | SOURCET | IPPANT | TECT.ZUB = IPPANT.ZUB<br>IPPANT.KAI = SOURCET.KAI |
| ① | IPPANT | TECT | | IPPANT.ZUB = TECT.ZUB |
| ① | IPPANT | RANKT | | IPPANT.KAI = RANKT.KAI |
| ① | IPPANT | SOURCET | | IPPANT.KAI = SOURCE.KAI |
| ② | RANKT | TECT | IPPANT | RANKT.KAI = IPPANT.KAI<br>IPPANT.ZUB = TECT.ZUB |
| ① | RANKT | IPPANT | | RANKT.KAI = IPPANT.KAI |
| ① | RANKT | SOURCET | | RANT.KAI = SOURCET.KAI |
| ② | SOURCET | TECT | IPPANT | SOURCET.KAI = IPPANT.KAI<br>IPPANT.ZUB = TECT.ZUB |
| ① | SOURCET | IPPANT | | SOURCET.KAI = IPPANT.KAI |
| ① | SOURCET | RANKT | | SOURCET.KAI = RANKT.KAI |

①: 1ST. ORDER LINK RELATION

②: 2ND ORDER LINK RELATION

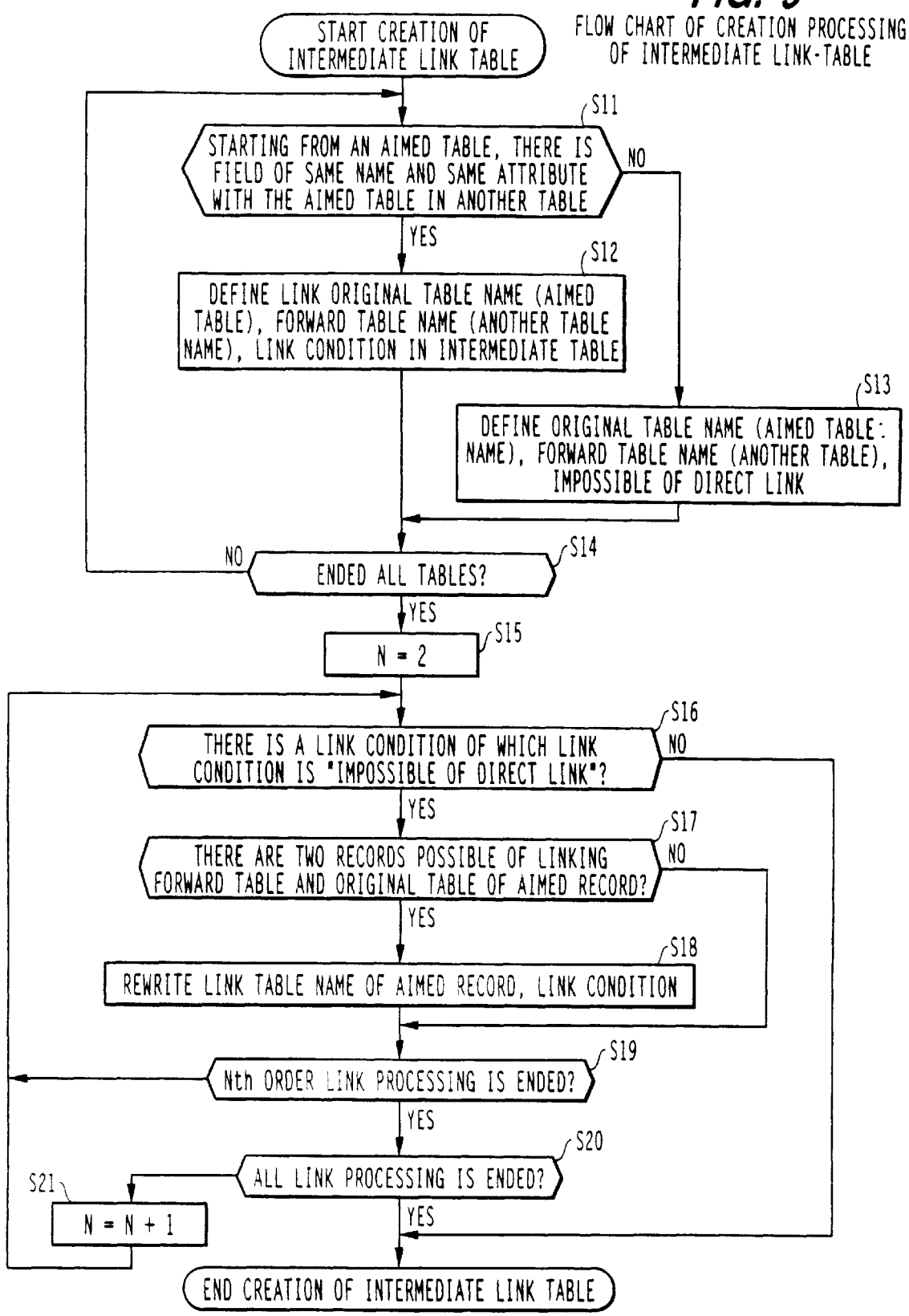
FIG. 9 FLOW CHART OF CREATION PROCESSING OF INTERMEDIATE LINK-TABLE

FIG. 10

42 SCREEN OF SEARCH RESULT LIST

| | |
|---|---|
| 42-1 | BROWSER SCREEN (SEARCH RESULT) |
| 42-2 | MEMBER NAME: KK_00K03 |
| | SEARCH CONTENT: ORDER SPECIFICATION → FUNCTION CN364 FIGURE NUMBER, DESIGNER |
| 42-3 | SEARCH CONDITION |
| | ORDER SPECIFICATION: C76L-0420-0002 |
| 42-4 | SELECT SENTENCE |
| | SELECT ZUB, SEK, SKA, KINO, TEH FROM K03 WHERE (TEH='C76L-0420-0002') ORDER BY TEH |
| | CHARACTER LENGTH (78) |
| 42-5 | SEARCH OPTION |
| | OUTPUT REPRESENTATION METHOD: TABLE FORM |
| | MAX. NUMBER OF SEARCH HIT: 100 CASES |
| 42-6 | OUTPUT OF CSV FORM FILE: NO OUTPUTTING |
| | PDF FILE LINK OF PURCHASE SPECIFICATION: SEARCH BY NATIONAL VERSION, MAKE OUT |
| 42-7 | SEARCH RESULT LIST |
| | HIT NUMBER: 1 CASE |

| RETURN TO SCREEN OF SEARCH DIRECTION | RETURN TO SIMPLIFIED SEARCH MENU |
|---|---|

| ITEM NUMBER | ORDER SPECIFICATION | FUNCTION | FIGURE NUMBER | CN ITEM NUMBER | DESIGNER | DEPARTMENT OF DESIGN |
|---|---|---|---|---|---|---|
| 1 | C76L-0420-0002 | NECATNE | 2511 | 5003 | "ITAKURA" | "DENGEN TEKUNORO" |

| RETURN TO SCREEN OF SEARCH RESULT LIST | RETURN TO SIMPLIFIED SEARCH MENU |
|---|---|

FLOW OF ITEM EDITION AND SEARCH MOMENT

FIG. 12

SCREEN OF ITEM EDITION (INITIAL SCREEN)

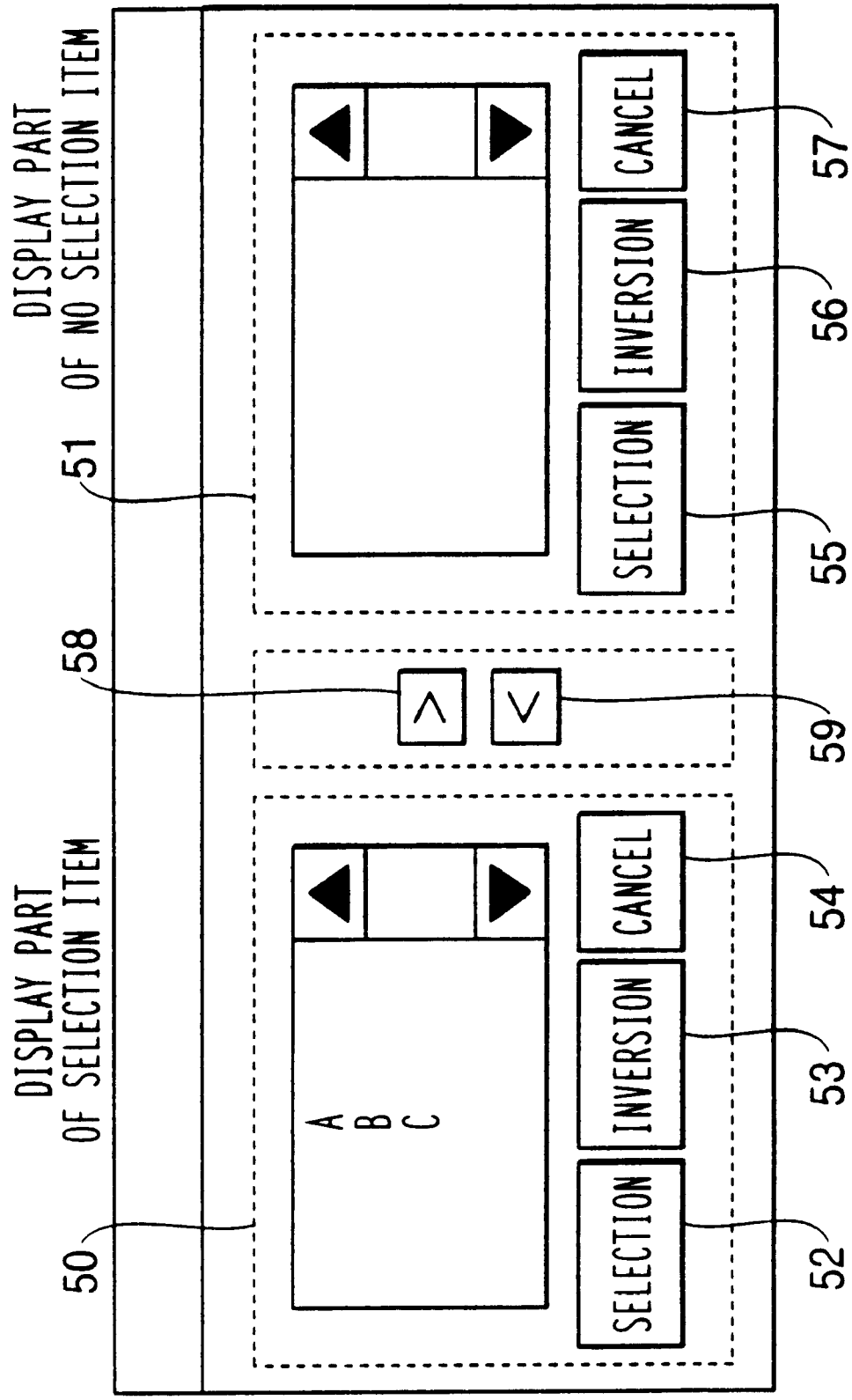
FIG. 13 EXPLANATION FIGURE OF ITEM EDITION OPERATION

FIG. 14

44  SCREEN OF ITEM EDITION (AFTER EDITION WORK)

BROWSER SCREEN (ITEM EDITION)

44-1
```
MEMBER NAME    ORDER           SEARCH CONTENT
KK_00K03       SPECIFICATION → FUNCTION CN364 FIGURE NUMBER, DESIGNER
```

ITEM EDITION

< ORDER SPECIFICATION 8, C76L-0420-0002><FUNCTION 4, >< FIGURE NUMBER 4, >
< CN ITEM NUMBER, 10, >< DESIGNER 6, >< DEPARTMENT OF DESIGN 6 >

44-2 — SEARCH CONDITION ITEM

| SELECTED ITEM | | NO SELECTED ITEM |
|---|---|---|
| ORDER SPECIFICATION | > < | FUNCTION FIGURE NUMBER CN ITEM NUMBER DESIGNER DEPARTMENT OF DESIGN |
| SELECTION INVERSION CANCEL | | SELECTION INVERSION CANCEL |

44-3 — LIST CONDITION ITEM

| SELECTED ITEM | | NO SELECTED ITEM |
|---|---|---|
| FIGURE NUMBER DESIGNER DEPARTMENT OF DESIGN FUNCTION ORDER SPECIFICATION | > < | CN ITEM NUMBER |
| SELECTION INVERSION CANCEL | | SELECTION INVERSION CANCEL |

44-4 — SORT CONDITION ITEM

| SELECTED ITEM | | NO SELECTED ITEM |
|---|---|---|
| ORDER SPECIFICATION | > < | |
| SELECTION INVERSION CANCEL | | SELECTION INVERSION CANCEL |

44-5 — APPLYING | CLEAR | RETURN TO SCREEN OF SEARCH DIRECTION

FIG. 15

HTML SOURCE OF SCREEN FOR SEARCH DIRECTION AFTER ITEM EDITION

```
<!--------DESCRIPTION OF SEARCH INDICATION-->
<!-                                         ->
<!-                                         ->
<FORM NAME="SEARCH_FORM" METHOD="POST">
<INPUT TYPE="HIDDEN" NAME="MODE"    VALUE="1">
<INPUT TYPE="HIDDEN" NAME="INF1"    VALUE="KK_00K03">
<INPUT TYPE="HIDDEN" NAME="INF2"    VALUE="ORDER SPECIFICATION → FUNCTION, CN364 FIGURE NUMBER, DESIGNER">
<INPUT TYPE="HIDDEN" NAME="TGNAME"  VALUE="KANI">
<INPUT TYPE="HIDDEN" NAME="TNAME"   VALUE="K03">
<INPUT TYPE="HIDDEN" NAME="DATACNT" VALUE="6">
<TABLE BORDER=0 CELLSPACING=3>
<TR><TD>ORDER SPECIFICATION</TD>
<TD> : <INPUT TYPE="TEXT" SIZE=30 NAME="SOURCET.TFH:1.5:1" VALUE="C76L-0420-0002"></TD>
<TD><BR></TD>
</TR>
</TABLE><P>
<INPUT TYPE="HIDDEN" NAME="IPPANT.KINO:0:4:-1">
<INPUT TYPE="HIDDEN" NAME="IPPANT.ZUB:0:1:-1">
<INPUT TYPE="HIDDEN" NAME="RANKT.KBAN:0:0:-1">
<INPUT TYPE="HIDDEN" NAME="TECT.SEK:0:2:-1">
<INPUT TYPE="HIDDEN" NAME="TECT.SKA:0:3:-1">
<BLINK>
```

FIG. 16

46     SCREEN OF SEARCH RESULT LIST

| | |
|---|---|
| 46-1 | BROWSER SCREEN (SEARCH RESULT) |
| 46-2 | NUMBER NAME: KK_00K03 |
| | SEARCH CONTENT: ORDER SPECIFICATION → FUNCTION CN364 FIGURE NUMBER, DESIGNER |
| 46-3 | SEARCH CONDITION<br>ORDER SPECIFICATION: C76L-0420-0002 |
| | SELECT SENTENCE<br>SELECT ZUB, SEK, SKA, KINO, TEH FROM K03 WHERE (TEH='C76L-0420-0002')<br>ORDER BY TEH |
| 46-4 | CHARACTER LENGTH (78) |
| 46-5 | SEARCH OPTION<br>OUTPUT REPRESENTATION METHOD:   TABLE FORM<br>MAX. CASE NUMBER OF SEARCH HIT:   100 CASES<br>FILE OUTPUT OF CSV FORM:   NO OUTPUT |
| 46-6 | PDF FILING OF PURCHASE SPECIFICATION: SEARCH BY NATIONAL VERSION, MAKE OUT |
| 46-7 | SEARCH RESULT LIST<br>HIT NUMBER: 1 CASE |

| RETURN TO SCREEN OF SEARCH DIRECTION | | | | | RETURN TO SIMPLIFIED SEARCH MENU |
|---|---|---|---|---|---|

| ITEM NUMBER | FIGURE NUMBER | DESIGNER | DEPARTMENT OF DESIGN | FUNCTION | ORDER SPECIFICATION |
|---|---|---|---|---|---|
| 1 | 2511 | "ITAKURA" | "DENGEN TEKUNORO" | NECATNE | C76L-0420-0002 |

| RETURN TO SCREEN OF SEARCH DIRECTION | RETURN TO SIMPLIFIED SEARCH MENU |
|---|---|

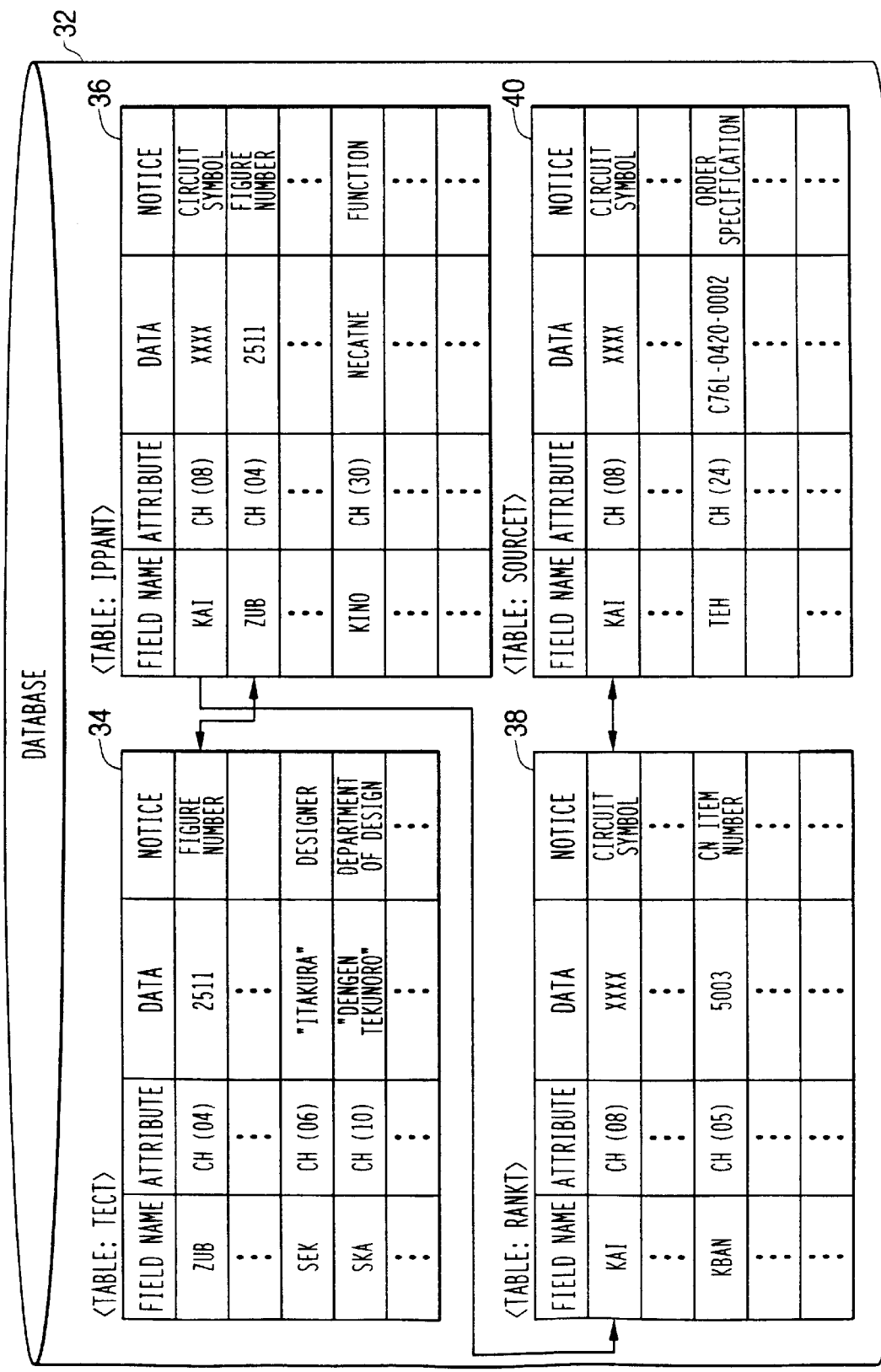
FIG. 18 PRIOR ART EXAMPLE OF DATABASE

FIG. 19A PRIOR ART
HYPERTEXT PART <INITIAL SCREEN: HTML SOURCE>

```
<!---------------------------->
<!-DESCRIPTION OF SEARCH DIRECTION->
<!---------------------------->

ORDER SPECIFICATION: SEARCH INFORMATION OF<INPUT TYPE="TEXT SIZE=24
VALUE=" " MAXLENGTH=24 NAME="TEH">
```

FIG. 19B PRIOR ART
SQL SENTENCE DEFINITION PART

```
SELECT  SOURCET, TEH, IPPANT.KINO, IPPANT.ZUB, RANKT.KBAN, TECT_SEK, TECT, SKA
FROM    SOURCET, IPPANT, RANKT, TECT
WHERE   SOURCET.TEH='XXXXXXXXXXXX' AND
        SOURCET.KAI=RANKT.KAI AND RANKT.KAI=IPPANT.KAI AND IPPANT.
        ZUB=TECT.ZUB
        ORDER BY SOURCET.TEH;
```

FIG. 19C PRIOR ART
CGI PROCESSING PART <CGI PROGRAM>

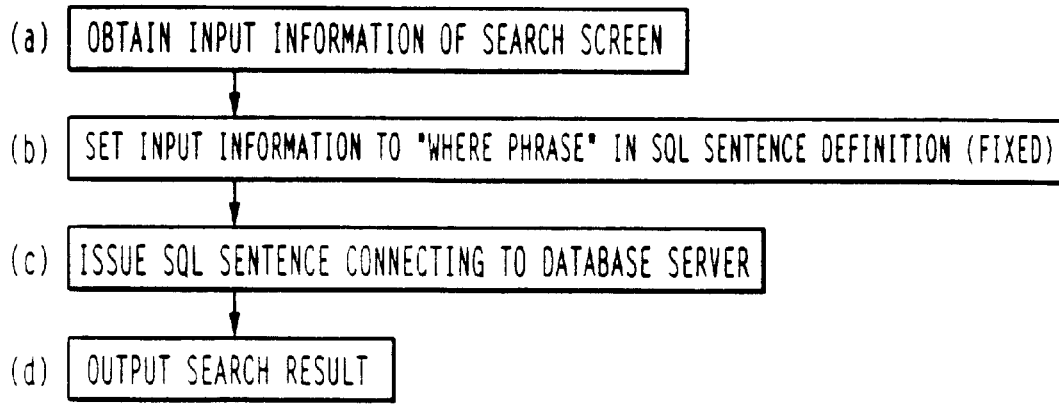

(a) OBTAIN INPUT INFORMATION OF SEARCH SCREEN
(b) SET INPUT INFORMATION TO "WHERE PHRASE" IN SQL SENTENCE DEFINITION (FIXED)
(c) ISSUE SQL SENTENCE CONNECTING TO DATABASE SERVER
(d) OUTPUT SEARCH RESULT

FIG. 20A PRIOR ART

INITIAL SCREEN

| BROWSER SCREEN |
|---|
| ORDER SPECIFICATION → FUNCTION CN364 FIGURE NUMBER, DESIGNER |
| ORDER SPECIFICATION: SEARCH INFORMATION OF [ ] |
| SELECTION OF OUTPUT FORMAT [TEXT FORMAT ▼] |
| [SEARCH]   [CLEAR] |

FIG. 20B PRIOR ART

INPUT

ORDER SPECIFICATION: [ C76L-0420-0002 ]

FIG. 20C PRIOR ART

HTML SOURCE

ORDER SPECIFICATION: < INPUT TYPE="TEXT"... VALUE="C76L-0420-0002"...

FIG. 20D PRIOR ART

SEARCH RESULT SCREEN

| BROWSER SCREEN |
|---|
| ORDER SPECIFICATION → FUNCTION CN364 FIGURE NUMBER, DESIGNER |

SEARCH RESULT LIST

HIT NUMBER: 1 CASE

| RETURN TO SCREEN OF SEARCH DIRECTION | | | RETURN TO SIMPLIFIED SEARCH MENU | | |
|---|---|---|---|---|---|
| ITEM NUMBER | ORDER SPECIFICATION | FUNCTION | FIGURE NUMBER | DESIGNER | DEPARTMENT OF DESIGN |
| 1 | C76L-0420-0002 | NECATNE | 2511 | "ITAKURA" | "DENGEN TEKUNORO" |
| RETURN TO SCREEN OF SEARCH DIRECTION | | | RETURN TO SIMPLIFIED SEARCH MENU | | |

*SEARCH FOR NARROWING FIELD IS POSSIBLE BY BUTTON OF "RETURN" ON BROWSER

SYSTEM AND A METHOD FOR A DATABASE SEARCH, AND A MEDIUM FOR STORING DATABASE SEARCHING PROGRAMS

CROSS REFERENCE TO RELATED APPLICATIONS

This application claims priority to Japanese Patent Application 10-238307, filed Aug. 25, 1998 in Japan, the contents of which are incorporated herein by reference.

BACKGROUND OF THE INVENTION (1) Field of the Invention

The present invention relates to a database search system using a CGI (Common Gateway Interface) program in a world wide web (WWW) server, and more particularly to a database system, to a server device searching the database, to a client terminal, and to a medium storing database searching programs, in which users direct the search condition voluntarily for each of the users and obtain a search result list.

(2) Description of the Prior Art

A WWW(world wide web) browser is easy to operate, so it has been disseminated and used widely in recent times. A search system, for example in a database search system like a relational data base (RDB) etc., is realized in an intranet environment including a WWW client and a WWW server.

FIG. 17 shows an example of a structure of a database search system of the prior art.

As shown in FIG. 17, a client terminal 100 (which is the same as a client terminal 100') is a device which allows a user access to a data base 32 by using a WWW browser principle part 110, which is fundamental software used as a display browser, a hypertext part 111 for displaying on screen an HTML document received from WWW server 200, and a server processing request part 112 as a means for communicating with the WWW server 200. The client terminal 100 also includes a display 113 and input/output devices like a keyboard and a mouse (not shown in FIG. 17).

WWW server 200 is connected to the client terminal 100 through network 4, and is also connected to the database server 3 through the network 4. WWW server principle controller part 220 implements fundamental control like communication with another device. The CGI (Common Gateway Interface) processing part 221 receives processing requests from the server processing request part 112 of the client terminal 100, accesses the database server 3 to receive search results, and sends the search results to the client terminal 100. SQL sentence defining part 222 includes various kinds of models of search programs defined by an SQL sentence, which is a language used for searching the database 32 which the database server 3 manages. Hypertext part 223 is an HTML (Hypertext Markup Language) source for displaying the display resulting from a database search.

As CGI processing part 221, SQL sentence defining part 222 and hypertext part 223 are one set, a plurality of sets thereof are provided according to the numbers of search screens shown on displays 113.

The database server 3 manages the database 32. RDB server fundamental part 30 is fundamental software which accepts requests made by WWW server 200 and manages relational database (RDB) 32. SQL sentence implementing part 31 implements the SQL sentence and searches the database 32.

FIG. 18 shows the database 32 of the search object. The database 32 in following expression is a relational database and is, for example, composed of tables such as table TECT 34, table IPPANT 36, table RANKT 38, and table SOURCET 40.

The table TECT 34 is a table concerning technology, and includes field ZUB of figure number, field SEK of designer, and field SKA of design department. The table IPPANT 36 is a table concerning general symbols, which includes field KAI of circuit symbols, and field ZUB of figure numbers (a kind of item number), and field KINO concerning function. The table RANKT 38 is a table concerning basic rank, which includes fields KAI concerning circuit symbol, and field KBAN of CN item number. The table SOURCET 40 is a table of product information by circuit symbol, which includes field KAI and field THE of order specification (number) etc.

FIG. 19A shows an example of the hypertext part 223 shown in FIG. 17, and it is HTML source sent first to the client terminal 100, in response to the search request from the client terminal 100, and is that for displaying an initial screen.

In the HTML source of FIG. 19A, the tag of "<INPUT TYPE= . . . " makes one line of input field. "SIZE= . . . " defines a length of input field. "VALUE= . . . " directs a text which is displayed in an input field as default." "MAXLENGTH= . . . " defines the maximum character number possible to input. "NAME=" . . . "" indicates a field name, and it is concealed characters which are used to decipher the sending data.

FIG. 19B shows an example of an SQL sentence definition in SQL sentence defining part 222 of FIG. 17. In this SQL sentence, the SQL sentence directs order specification, function, figure number, CN item number, designer and department of design, using field THE (order specification) of table SOURCET as the key thereof.

FIG. 19C shows an example of a process executed by CGI processing part 221 shown in FIG. 17.

In following, an example of the system shown in FIG. 17 is explained.

In searching the database 32, the user of the client terminal 100 indicates a URL(Universal Resource Locator) of WWW server 200 defined preliminarily by using a browser of the client terminal 100. The indicated HTML source is downloaded from the WWW server 200. The HTML source is a hypertext information of the search direction description shown in FIG. 19A as an example, and an initial screen of the browser shown in the FIG. 20A is displayed by it.

Now when "C76L-0420-0002" is input as shown in FIG. 20B into the input field of the order specification, and operating search button, input information of "VALUE= "C76L-0420-0002"" in "<INPUT TYPE= . . . " of HTML is transferred to CGI process part 221 of WWW server 200 from the server process request part 112. As a result, the CGI program in CGI process part 221 implements following process (a)–(d) as shown in FIG. 19C.

(a) At first, the input information of search screen is obtained. In the present example, the input information of order specification number "C76L-0420-0002" is obtained.

(b) The input information is inserted into the SQL sentence definition of SQL sentence defined part 222 provided corresponding to the CGI processing part 221. That is, "C76-0420-002" is set in the "XXXXXXXXXXXXX" in the WHERE phrase of SQL sentence definition shown in FIG. 19B and shown in FIG. 20C.

(c) Next, connection to the database server 3 performed, and the SQL sentence made in the above mentioned process (b) is issued.

(d) After the search result is obtained, the search result is sent to the client terminal 100.

FIG. 20D shows an example of a screen of a search result list sent by WWW server 200. In the example, one case data is shown as the search result.

As shown in the above mentioned prior art, combinations of CGI processing part 221 and SQL sentence defining part 222 and hypertext part 223 for displaying a screen are defined all is an one-to-one relationship, so the search screen for displaying search direction and search result, and SQL sentence definition by the search direction, and CGI program for issuing the SQL sentence are determined rigidly. Therefore, new CGI process part 221, SQL sentence definition part 222, and hypertext 223 for displaying the screen should be provided in the WWW server 220 corresponding to the different displaying embodiments of search contents and the search result.

Like this, in the prior art, specialists having database knowledge and expertise in CGI programs make typical search screens and realize the search system, so the users of the client terminal 100 cannot change the search condition voluntarily.

In the prior art, a person who understands well the table structure and field information of relational databases, and knows how the table and the field are linked makes up the search sentence, and definitions such as the search screen of HTML are made similarly, so there are the following problems.

The first problem is when a new search condition and search menu etc. or screen for displaying search result are requested, CGI program, search sentence (SQL sentence definition) and screen definition (HTML source) are made by manufacture work, so the development working steps are great.

The second problem is the client side cannot customize the search condition and search screen so as to fit with his circumstances.

The third problem is that the person who has knowledge of the database and is an expert in intranet work environment only can deal with either the change of search condition and search screen.

SUMMARY OF THE INVENTION

The present invention has objects that solve the above mentioned problems and realizes the most suitable and flexible search system by using intranet (WWW client terminal, and WWW server), and relational databases, and provides a system in which the user of a client terminal can change a parameter of a search condition, and a method for displaying a list of a search result easily and voluntarily.

An object of the present invention is to reduce the number of development working steps for searching a database.

Another object of the present invention is to allow a client to customize the search condition and search screen to fit the his circumstances.

A further object of the present invention is to allow a user who is not on expert in database searching to easily modify the search screen and search conditions.

Yet a further object of the present invention is to provide a suitable and flexible search system.

The present invention relates to a database search system that a client terminal and a WWW server such as the intranet are connected through a network, and it is characterized in that database information for a search object and search information are provided in a hypertext part defining a screen for a search, and creates automatically a database search sentence (SQL sentence) based on the information described in the hypertext part. Therefore, the search condition and the method for displaying the search result the list are changed simply by changing a screen definition without changing database search sentence of SQL sentence definition etc.

Further the present invention relates to automatic creation of an SQL sentence, realizes automatically the creation of link relation information between tables in relational databases. As a result, the SQL sentence is created automatically based on the minimum necessary information in the hypertext, and the change of database construction is dealt with flexibly.

Also the present invention comprises search list item editing means which edits the descriptive information in a hypertext part defining a screen by GUI (Graphical User Interface) in the client terminal. Therefore, the user of the client terminal changes voluntarily the search direction condition, list condition of search result, and sort condition of result output.

The above mentioned program for realizing the search server and client terminal is stored in suitable memory medium such as a computer readable movable medium memory, semiconductor memory and hard disk.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 3 shows an example of a direction screen of the present invention.

FIG. 4 shows a part of HTML source displaying a search direction screen of the present invention shown in FIG. 3.

FIG. 5 shows flow chart of process of CGI process part of the present invention.

FIG. 6 shows an example of SQL sentence generated of the present invention.

FIGS. 7A and 7B show link relation of tables of database shown in FIG. 18 of the present invention.

FIG. 8 shows an example of intermediate link table generated automatically by a mode implementing the present invention.

FIG. 9 shows flow chart of intermediates link table of the present invention.

FIG. 10 shows an example of a screen of search result list of the present invention.

FIG. 12 shows an example of a screen of item edition shown at first of the present invention.

FIG. 13 shows an explanation drawing of screen of item edition operation of the present invention.

FIG. 14 shows an example of a screen of item edition after operation of edition of the present invention.

FIG. 15 shows an example of screen of search direction of HTML source after operation of item edition of the present invention.

FIG. 16 shows an example of a screen of search result list of the present invention.

FIG. 18 shows an example of database for search object of the prior art.

FIGS. 19A, 19B and 19C show a Hypertext part, an SQL sentence and a CGI process part of the prior art.

FIGS. 20A, 20B, 20C and 20D show an explanation drawing of a search of the prior art.

DESCRIPTION OF THE PREFERRED EMBODIMENTS

Figure 1:
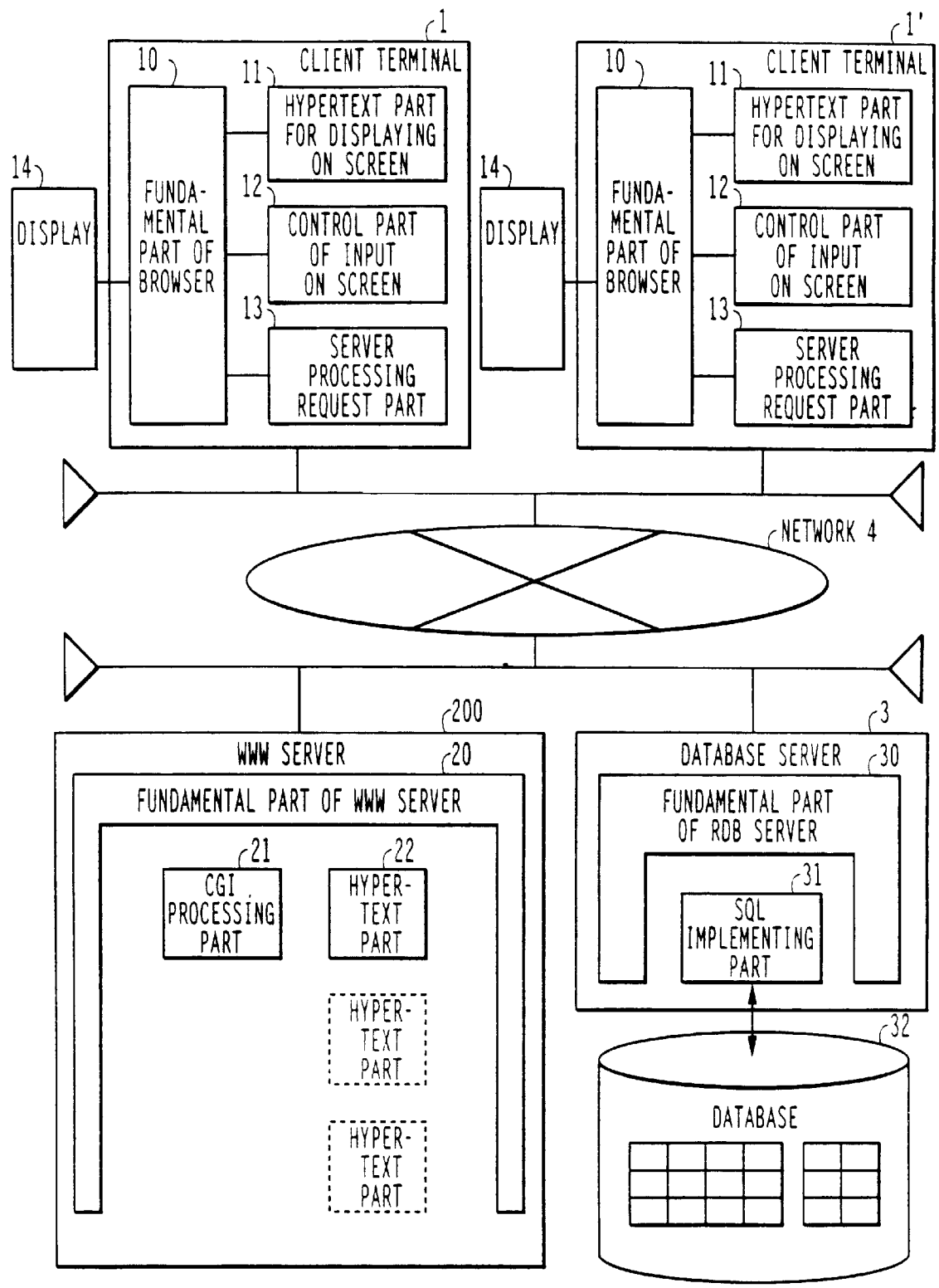
FIG. 1 shows an example of components database search system of a mode implementing the present invention.

FIG. 1 shows an example of an embodiment of a database search system of the present invention.

Client terminal 1 (the same as client terminal 1') is a user's device for accessing a database by using a WWW browser. A fundamental browser 10 is fundamental software for displaying on screen the browser, and a hypertext part 11 for screen displaying 11 is HTML document for screen displaying received from WWW server 2. Screen input controller 12 includes a search list item editing function editing information of a description in a hypertext part 11 for defining a screen to display on a screen. The screen input controller part 12 may be realized by Java Script that is a script language developed by the Netscape Communication company and the Sun Microsystems company in the U.S.A. Server processing request part is a means for communicating with WWW server 2. The client terminal 1 includes an input/output device such as a display 13 and a key board and a mouse etc.

WWW server 2 is connected to the client terminal 1 through the database server 3. WWW server fundamental terminal 20 implements the fundamental controls in the WWW server 2 such as communication with another device. CGI (Common Gateway Interface) processing part 21 receives the processing request from the server processing request part 13 and accesses the database server 3 to accept the search result thereof and sends the search result to the client terminal 1.

More particularly, CGI processing part 21 of the present system generates the database search sentence (SQL sentence) based on the information written in the hypertext part 22, and outputs the search result of the database 32 searched based on the created database search in database server 3. Referring to the automatic creation of the database search sentence, when a table and the other table comprising the relational database are related directly or indirectly through one or plural other tables, an inter link table having information (link information) showing the relation between the tables is created and the database search sentence is created based on it.

The hypertext part 32 stores the HTML source of screen displaying for the database search in the client terminal 1, and the database information and search information for the search object are described in the HTML source of the present invention, as mentioned later in detail thereof.

Figure 17:
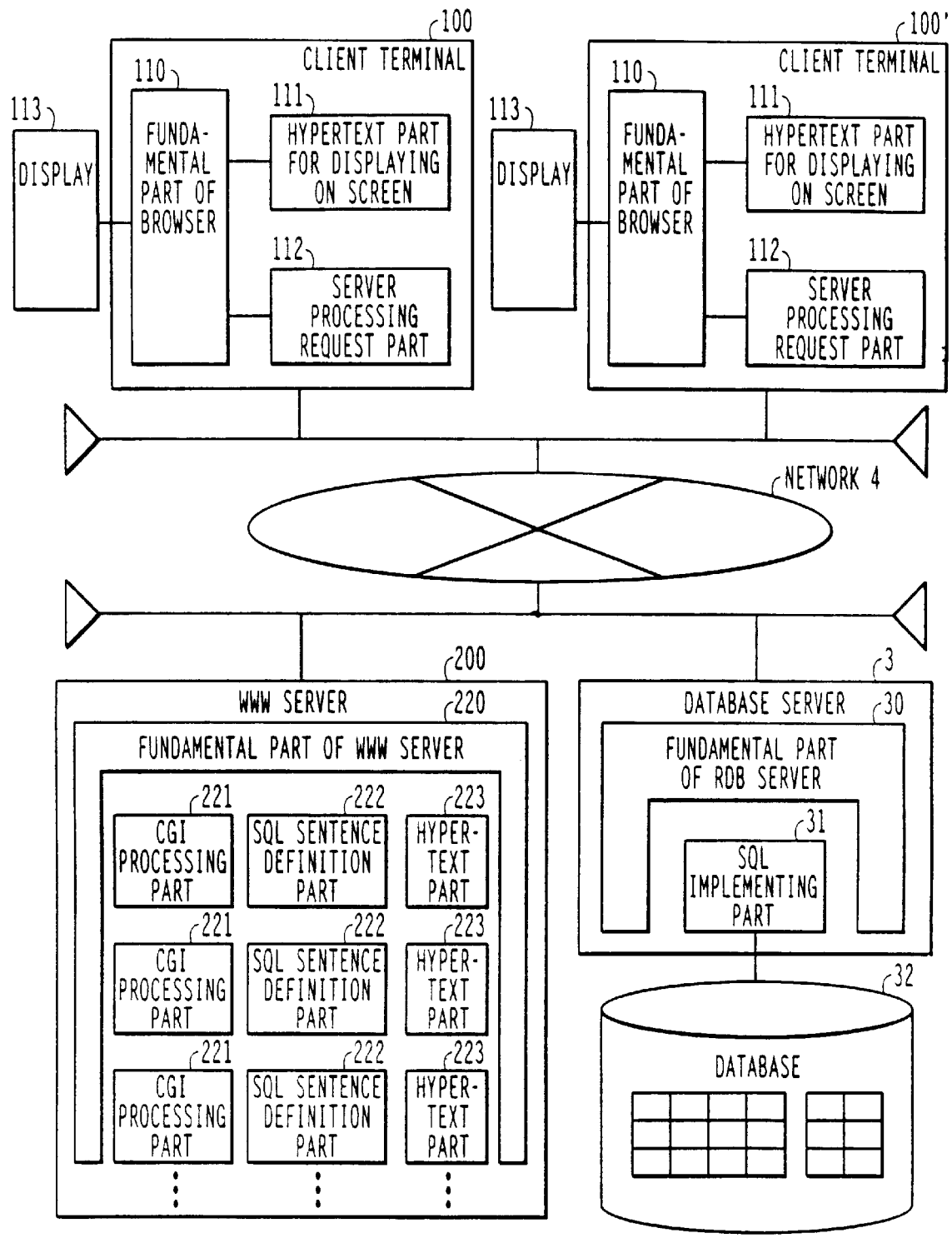
FIG. 17 shows an example of component of database search system of the prior art.

The database server 3 manages the database 32. The RDB server fundamental part 30 is fundamental software which receives the request from the WWW server 2 and manages the relational database (RDB). The SQL implementing part 31 implements the SQL sentence, and searches data in the database 32. The database server 3 is the same as the prior art database server explained in FIG. 17.

In the following explanation, the contents of database 32 are the same as those shown in FIG. 18 explained in prior art.

Figure 2:
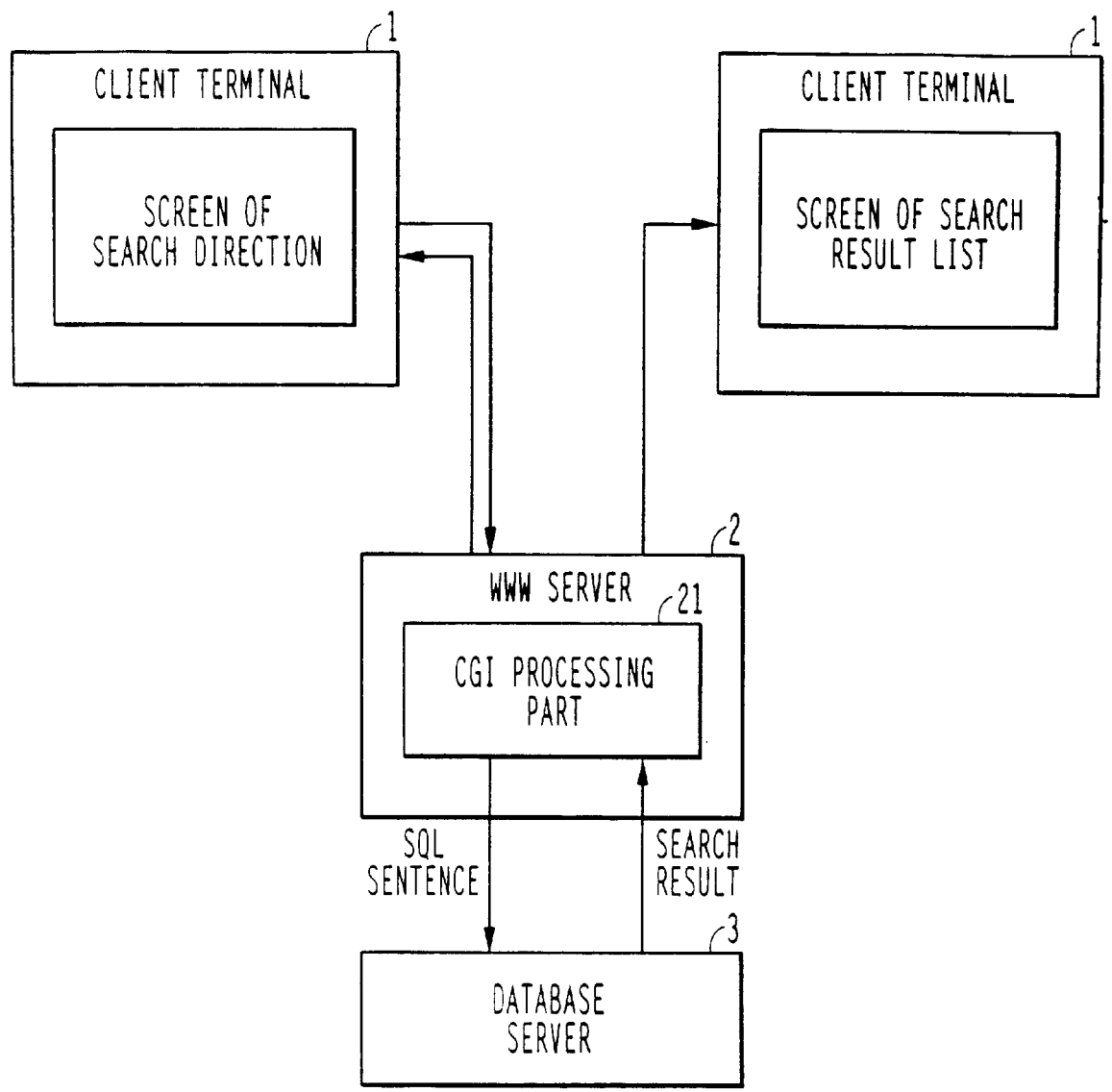
FIG. 2 shows whole process flow in case of database search of a mode implementing the present invention.

The process flow in time of database searching of a mode implementing the present invention is shown in FIG. 2.

Searching the database 32, the User of the client terminal 1 directs the URL (Universal Resource Locator) of WWW server 2 decided preliminarily by using the browser of client 1. As a result, the HTML source is downloaded from the hypertext of a WWW server 2 to the client server 1. The browser fundamental part 10 of client terminal 1 keeps the HTML source downloaded therefrom and displays it in the display 14 (shown in FIG. 1).

FIG. 3 shows an example of a search direction screen 33 displayed by the method of the present invention.

In FIG. 3, a region 33-1 of "MEMBER NAME" is for displaying member name, order specification and contents of search. The member name is a kind of item and it defines a search table group. In the example the member name is "KK_00K03", and "K03" defines, for example, the table group of FIG. 18. Screen 33 of FIG. 3 indicates that the search contents includes "FUNCTION,CN364, FIGURE NUMBER, and DESIGNER". The search contents are formed from the order specification "C76L-0420-0002".

A region 33-2 of the order specification is for inputting item number of order specification. In this example the input item number is "C76L-0420-0002".

A region 33-3 under the region of the order specification is for inputting "Output representation method", "Showing max. case number" and "File output of CSV form". The "output representation method" is, for example, text form or table form etc. of table, the "Showing max. case number" is showing maximum case number of the search result, and the "File output of CSV form" is a direction for displaying or not a calculation program in table form, for example Excel (trade mark), Lotus 1,2,3 (trade mark), etc.

"Search", "Clear" and "Item edition" are operation buttons for starting each function thereof. FIG. 4 shows a part of the HTML source displaying the search direction shown in FIG. 3.

In the HTML source in FIG. 4, "<FORM NAME=" ... " ... >" shows a writing possible section, and "METHOD="POST"" shows data for sending out. "<INPUT TYPE= ... " makes an input field, and especially ""HIDDEN"" indicates something not to be displayed. "NAME="MODE"" is a processing mode, "NAME="INFI"" is the first search information, "NAME="INF2"" is the second search information, "NAME="TGNAME"" is table group name, "NAME="TNAME"" is a table name, "NAME=DATACNT"" shows field number, as these are not related directly to subject of the present invention, these detailed explanations are neglected. "VALUE=" ... "" shows initial value.

Item form indicated as ""NAME=" ... "" in each table in following "<INPUT TYPE= ... " includes "search condition table name, field name; search condition flag; list item flag; sort item flag". The database information and search information of search object include them in the HTML source.

The search condition flag directs a field thereof as a search condition or not, and according to the value, it has following meanings.

0: not search condition

1: search condition item 1

2: search condition item 2

...

List item flag makes a field thereof the list item of search result or not, and directs the order of the list item, and has following meaning according to the value.

0: not list item

1: list item 1

2: list item 2

...

the sort item flag directs sorting or not of the field thereof according to the field value in the case of displaying the search result, and has following meanings.

1: sorting

−1: not sorting

For example, "NAME="SOURCET.TEH;1;1;"" directs that the field THE of the table SOURCET is a search condition, displays the field of the first list item, and sorts the search result according to the field value.

Using in the condition of the search directed by the screen of FIG. 3, when a user of a client terminal 1 inputs the search condition of a search item "Order Specification" and pushes the "search" button, the screen input information "<INPUT TYPE="TEXT" . . . >" in HTML source shown in FIG. 4 and information of "<INPUT TYPE="HIDDEN" . . . " not shown contents thereof are sent to CGI processing part 21 of WWW server 2. CGI processing part 21 analyses the INPUT information, and creates automatically an SQL sentence, issues it to the data base server 3, receives the search result, and returns the information of result to client terminal 1.

FIG. 5 shows process flowchart of CGI process part 21 of the present invention.

Receiving the INPUT information from the client terminal 1, CGI process part 21 creates a SELECT phrase of the SQL sentence by an upper direction of a sort in INPUT information (Step S1 of FIG. 5). In case of the HTML source shown in FIG. 4, the SELECT phrase of ① shown in FIG. 6 is created, by arranging by upper direction of list item flag "d" in INPUT information <INPUT TYPE= . . . NAME= "aaaa.bbb;c;d;e" . . .

Next, a unique table name is created abstractly from the search condition table in INPUT information, and a FROM phrase is created (step S2), table name of "aaaaa" in INPUT INFORMATION <INPUT TYPE="aaaa.bbb;c;d;e . . . > of HTML source in FIG. 4 is arranged so as not to be overlapped, and a FROM phrase of ② shown FIG. 6 is created.

Further a part of a WHERE phrase is created from the search condition table and input value and search condition flag in INPUT information (step S3). In case of the HTML source shown in FIG. 4, part of ③ in the WHERE phrase shown in FIG. 6 from INPUT information <INPUT TYPE= "TEXT" . . . NAME="SOURCE.THE;1;1;1"VALUE= "C76L-0420-0002> of which search condition is 1.

Further information of link relation between tables necessary for the WHERE phrase is created by analyzing the link relations among tables (step S4). This process is explained in detail later (see FIGS. 7A and 7B). Part ④ of the WHERE phrase shown in FIG. 6 is created from this.

Further the ORDER BY phrase is made in the upper direction order of sort item flag INPUT information (step S5). In the case shown in FIG. 4, as only the sort item flag of <INPUT TYPE="TEXT" . . . NAME= "SOURCE.TEH;1;1;1"VALUE="C78L-0420-0002> is 1, ORDER BY phrase shown in FIG. 6 is created.

By the above mentioned process, when the SQL sentence shown in FIG. 6 is completed, CGI process part 21 connects to the database server 3 by using a function which WWW server fundamental control part 20 has to issue the SQL phrase (step S6). As the result, the search result of database 32 for SQL sentence shown in FIG. 6 is sent from the data server 3.

CGI process part 21 outputs the search result to the request original of client terminal (step S7).

In step S4 in the above mentioned process, the information of link relation which is necessary for creating the WHERE phrase is obtained by analyzing the link relation between tables, and it is embodied as shown as follows (see FIGS. 7A and 7B). By the process, database 32 containing plural tables, and even if the structure is complex, the WHERE phrase is created based on the necessary minimum information obtained from the HTML source.

In the database 32 shown in FIG. 18, table TECT 34 is a table concerning technology, and it has drawing number field ZUB, a designer field SEK and a design department field SKA etc. The table IPPANT 36 is a table concerning a general symbol, and it has a circuit symbol field KAI, a drawing field ZUB, and a field concerning to function KINO etc. The table RANKT 38 is a table concerning base plate rank and it has a circuit symbol field, and a field of CN item number KBAN etc. The table SOURCET 40 s a table of products information of each circuit symbol and it has a circuit symbol field KAI and an order specification (number) field THE etc. The table 18 which is used for the present invention is same as that of prior art.

Now the same field name is given to the field which manages same object in each table. The table TECT 34 and the table IPPANT 38 have their common field ZUB, and the table IPPANT 36 and the table RANKT 38 and the table SOURCET 40 have the common field KAI. A relation of two tables having common field is referred as a first order link relation like that.

As the table TECT 34 and the TABLE RANKT 38 do not have their common field between them, so they do not have the first order link relation, but the table TECT 34 and table IPPANT 36 have the first order link relation by their common field ZUB, and table IPPANT 36 and table RANKT 38 have the first order link relation by their common field KAI. Therefore the table TECT 34 and the table RANKT 38 have a link relation through the table IPPANT 36. This is referred as a second order link relation. The relation of the table TECT 34 and the table SOURCET 40 is the second relation similarly.

FIGS. 7A and 7B show the above mentioned relation. FIG. 7A shows the first order link relation, and FIG. 7B shows the second order link relation.

A table having link relations shown in FIGS. 7A and 7B is referred to as an intermediate table. An example of an intermediate table created automatically by the mode implementing the present invention is shown in FIG. 8.

The intermediate link table stores an original table name, a forward table name, a link table name and a link condition by each entry (record). The original table name shows a table name of fundamental table (original table) which is original of a link relation, and the forward table shows a table name of fundamental table (forward table) which is a forward link. The link table name shows a table name of a fundamental table (link table) related by common field which relates the tables in chain in case that the original table and the formed table do not have the first order relation between them.

The link condition defines a link relation between the original table and the forward table, and includes information showing the first order link relation between tables and combination thereof. Now, the information showing the first order link relation is defined by a table name of the original table, a table name of the forward table and their common field of the first order link relation key.

In FIG. 8, TECT.ZUB=IPPANT.ZUB of the link condition in the table shows that the table TECT and the table IPPANT are linked with in their common field ZUB. For example, TECT.ZUB=IPPANT.ZUB, IPPANT.KAI=RANKT.KAI of the link condition shows that they do not have directly the first order link relation and are linked through the table IPPANT. The link condition comprising combination of the link condition of the link condition of the first order link relation with TECT and IPPANT (TECT and IPPANT are linked with ZUB) and the link condition of the first order link condition with IPPANT and RANKT (IPPANT and RANKT are linked with KAI).

FIG. 9 shows flow chart of a process of the intermediate link table.

Step S11–step S14 show a process setting the information concerning to the first order link. In step S11, concerning each fundamental table which is managed in a relational data base, it is decided whether there is any table that has same name and same field in the other table by starting from each table itself. When there is the same name and same field name with the table itself, the process goes to step S12, and the original table name (itself table), the terminal table name (another table) and the link condition is settled.

When there is not a field of the same name and attribute with the table itself, the control goes to Step S13, and define by setting an original table name (table itself), a forward table name (another table name) and a direct link impossible as the link condition.

At step S14, it is decided whether the process concerning the first order link relation ends in all tables or not, and step S11~step S13 are repeated up to end. After it, the process transfers to the $N^{th}$ order link relation ($N \geq 2$).

At step S15, N=2 is set.

At step S16, a record of which link condition in the intermediate link table is "direct link impossible" (entry of intermediate link tale) is searched successively and when the record of "direct link impossible" is found the process goes to step S17. When the record of link condition of "direct link impossible" is not found at all, the creation of the link table is ended.

At the step S17, it is checked whether there are two records (original record) of link condition of "direct link impossible" of which the original table and the forward table are found. For example, after having processed the step S11~step S14 setting the first order link relation, the link condition of the record of <original table name:TECT>- forward table name:RANKT> is "direct link impossible", but by using the condition of two records of <original table name :TECT>-<forward table name :IPPANT> -<original table name :IPPANT>-<forward table name:RANKT>, the two records are linked. Like this, when the aimed records are linked by the two records, the process goes to step S18. Otherwise, the link formation is impossible and the process goes to step S19.

At step S18, in a column of link table of the original record, an intermediate table name (IPPANT of the above mentioned example) is set, and a link condition abstracted from the two records are set in the link condition.

At step S19, it is decided at process of $N^{th}$ order link step whether all records of the intermediate link table is ended or not, and when there is a record which is not processed, returning to step S16 the same process is repeated.

When all link processes are ended, at step S20, the process for all links is ended. When record of which link condition is "direct link impossible" is left or new link condition may not be set, it is decided for creation of all link process to be ended, and creation of intermediate link table is ended.

When there is a possibility of setting new link relation, at step S21 one is add to N, and returning to S16, the same process of $N^{th}$ order link relation is repeated.

At step S4 of FIG. 5, by using the intermediate table created by the above mentioned process link contents (link condition) between the tables is created to generate WHERE phrase. By this, ④ part of the SQL sentence shown in FIG. 6 is automatically generated.

FIG. 10 shows an example of a screen 42 of a search result list displayed on the client terminal. In FIG. 10, 42-1 is an area showing a title of "browser screen", 42-2 is same as an area 33-1 showing an item of the member name explained in FIG. 3. 42-3 is same as an area showing search condition explained in FIG. 3. 42-4 is an area showing select sentence which is made automatically from the search condition. By the result of the search condition of "Order specification: C76-0420-0002" shown in the area of 42-3 and the "K03" of the member name, the search result of the SQL sentence shown in FIG. 6 is composed and displayed in the screen 42. 42-4 is an area showing the select sentence. In the sentence the K03 is a table name showing a table group (for example, table group shown in FIG. 18), and the sentence shows that "ZUB,SEK,SKA, KINO,THE" is made from the table K03 ordered by THE (field of order specification of C76L-0420-0002). 42-5 shows an area of search option explained in FIG. 3 (33-3). 42-6 is an area for showing guides for users. So the area does not have a function except to display therein the phrase set as a default. 42-7 shows an area showing the search result. In the example, "Order specification", "Function", "Chart number", "CN item", "Designer" and "Designing department" are displayed in order of item in the area of 42-7.

Figure 11:
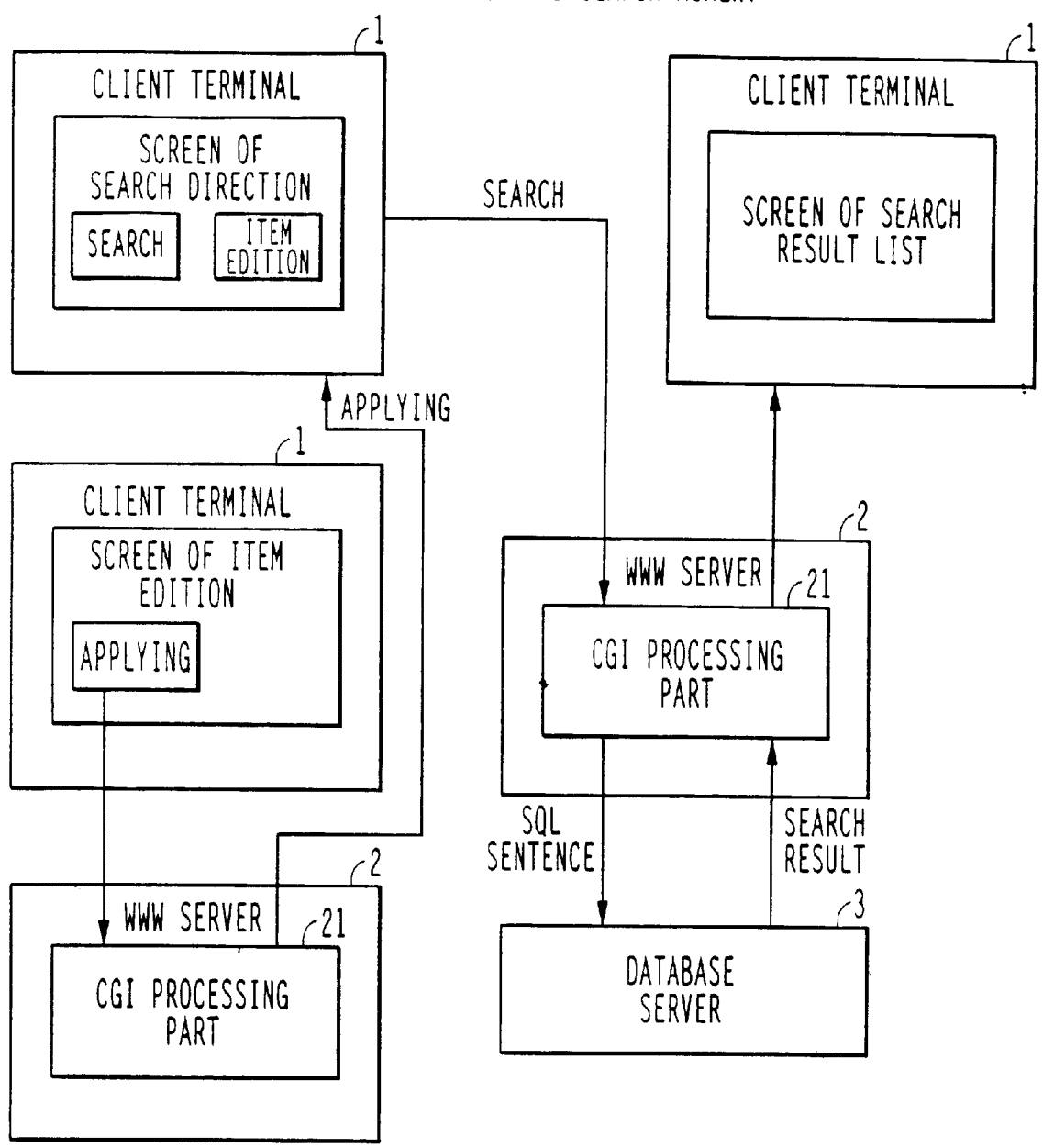
FIG. 11 shows flowchart in case of item edition and search of the present invention.

Next, edition function of search list displaying which the image input control part 12 of the client terminal has is explained. FIG. 11 shows the flow of item edition and searching. Search client terminal 1 and WWW server 2 are shown in FIG. 11.

URL (Universal Resource Locator) of WWW server 2 being indicated by the client terminal 1, the HTML source is downloaded to the client terminal 1 indicating the WWW server 2 from WWW server 2. The browser fundamental part 10 of the client terminal 1 keeps the downloaded HTML source in the hypertext part 11 for screen displaying and displays on the display 14.

The downloaded HTML source is the HTML source for displaying the search directing screen shown in FIG. 4 mentioned above, and the search direction screen shown in the display 14 is a screen shown in FIG. 3.

Pushing the button of "item edit" on a screen for the search edition shown in the FIG. 3, user of the client terminal 1 can edit freely items connecting search condition of the database search thereafter, condition list displayed as the search result, and sort condition by selecting button.

Figure 12:
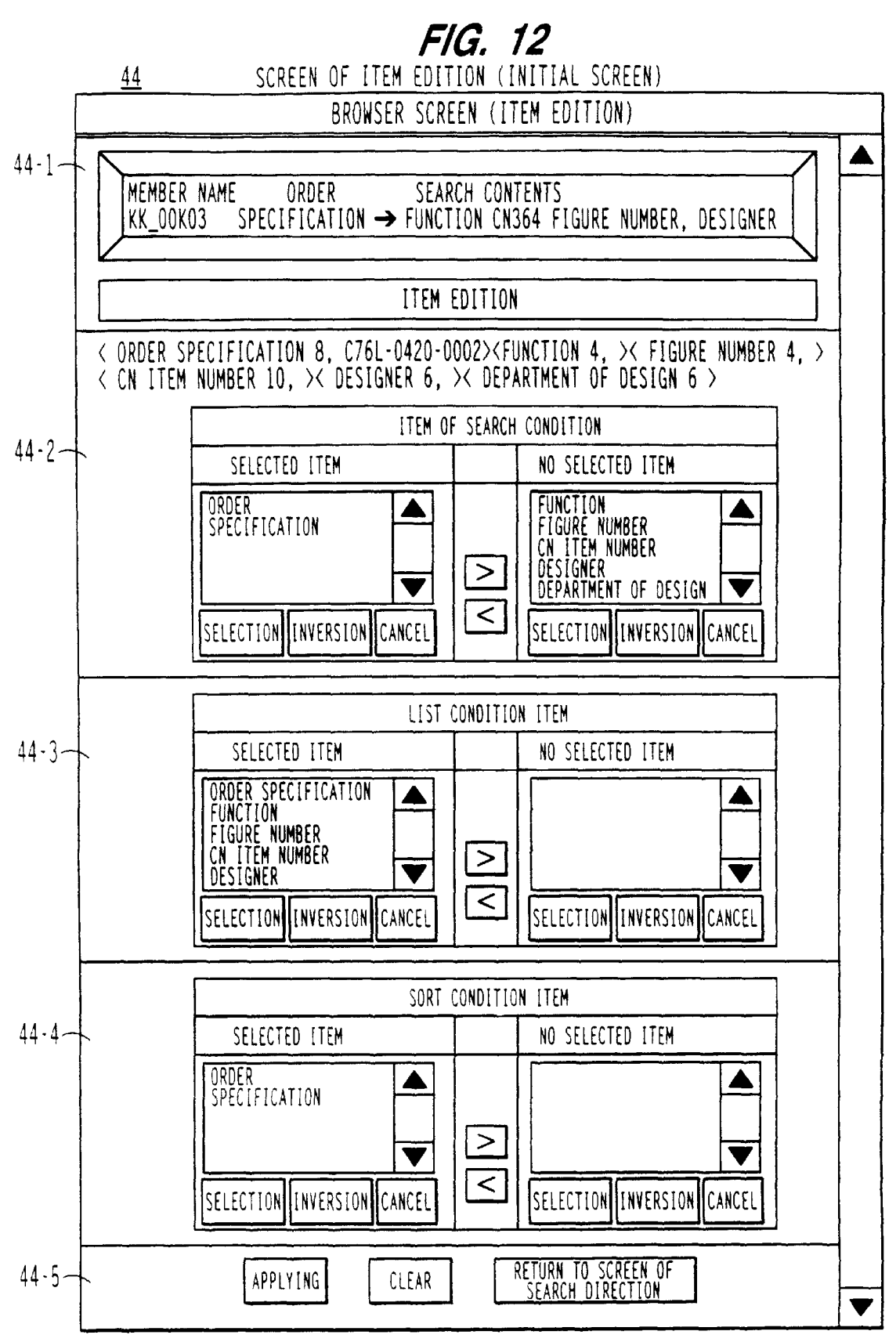

FIG. 12 shows an example of an initial item edition screen 44 shown at first by operating the button of "item edition" shown in FIG. 3. The item edition screen 44 is used for editing the item of search condition, the list condition and the sort condition. In FIG. 12, 44-1 is an are showing member name etc. 44-2 shows an area for editing item of search condition. 44-3 shows an area for editing list condition item. 44-4 shows an area of sort for editing condition item. The edit result based on an input on the item edition screen 44 is reflected to the HTML source shown in FIG. 4. But the modification of the HTML source is implemented automatically in the device of the present invention, so it is not necessary for the user to modify the HTML in itself. 44-5 shows an area showing buttons for operating.

In the FIG. 12, the "Order specification" in the item of search condition corresponds to the definition of the order specification in FIG. 15, that is <TR> <TD> order specification </TD>

<TD>:••••VALUE="C76L-0420-0002"> </TD >

When the selected item is changed, for example, from the order specification to the figure number, as the result of the edition of item search condition, the change reflects to the definition of HTML source shown in FIG. 15. As the result, the display of order specification in region 42-3 in FIG. 10 is changed to the figure number (edited item). According to the change, the search contents are changed to the item corresponding to the item of the figure number.

FIG. 13 shows an explanation figure of the item edition operation. In the item edition screen shown in FIG. 12, search condition item, list condition item, sort (SORT) condition item are specified by operation of a pointing device such as a mouse etc., and these are edited as followings. There are a selected item displaying part 50 and no selected item displaying part 51, on the edition screen of each search condition item, list condition item, sort condition item as shown in FIG. 13, and selected item and no selected item on each are displayed.

Comparing with the HTML source shown in FIG. 4, it is clear that the selected item as the search condition item is "Order specification (SOURCE.TEH)" of search condition flag 1. Another item is not selected because of the search condition flag of 0. And the list condition item shows "order specification" "figure number", "CN item number", "designer", . . . are selected by the order. Sort search condition item by this order. At the sort condition item, "order specification: is selected.

As shown FIG. 13, a selection button 52,55, an inversion button 53,56 and cancel button 54,57 are on the selected item display part 50, and when selecting the selection button 52,55, all items of the search area are selected as the edition object. When each item is selected, any item of the area concerning the item is selected by a click operation of a pointing device. The inversion button 53,56 is a button for selecting each item except for the selected area. The cancellation button 54,57 are buttons for returning the selected item in the area to an initial state.

A button 58 in a right direction is that which indicates moving the item selected in the area of selection item display part 50 to the lowest part of area of no-selection item display part 51. A button 59 in a left direction is that which indicates moving the item selected in the area of non-selection item display part 50 to the lowest part of area of selection item display part 51.

For example, supposing the list condition item to be edited by the button operation, as shown in FIG. 14. In FIG. 14, "CN item number" is no-selection item, and is edited as the order of the selection item is "figure number", "designer", "design department", and "order specification.

The initial HTML source shown in FIG. 4 is modified to HTML source shown in FIG. 15. The process is operated by the screen input control part 12 described by JavaScript and as it is the process changing the search condition flag within INPUT information "<INPUT TYPE . . . >", list item flag, source item flag, it is realized easily, and a detailed explanation of the changing process is not included herein.

In the item edition screen shown by FIG. 14, pushing the "applying "button, an edition result of HTML source is sent to CGI processing part 21 of WWW server. Next, a search direction is directed from the client terminal 1, the search is implemented by the same flow with that shown in FIG. 2, and finally the search result is shown to the client terminal 1 as shown in the search result list screen 46 of FIG. 16.

Before the item is edited, the search screen of the search result list 42-7 is shown in FIG. 10, and the item condition is edited based on the input on the screen of the item edition 44-2, 44-3, and 44-4 shown in FIG. 14. As a result, the item and the order is displayed in order of chart number, designer, design department, function, order specification as shown in the FIG. 16. Areas 46-1 through 46-7 of search result of screen 46 correspond, respectively, to areas 42-1 through 42-7 of screen 42 shown in FIG. 10 and are populated based upon the result of FIG. 14.

An example of the list condition item is explained, but the search condition item and the sort condition item may be also edited easily with same simple operation. The edited result may be registered and served to WWW server 2 by each user, if necessary.

WWW server 2 and the database server 3 of the system shown in FIG. 1 are deferent devices, but it is possible that one device has the above mentioned function by WWW server and database construction.

As mentioned above, by the present invention, it is not necessary to have the fixed SQL sentence definition and offers the database search function by the common CGI process part which does not depend on the search condition, and the load of server maintenance cost is lowered.

As the search condition, the list condition, the sort condition etc. are changed easily by the client terminal and GUI interface, users who are not skill, and is the database search phrase (SQL sentence) and link relation between tables are able to obtain necessary information (field value of search result), by having the least knowledge what information is reserved in the database.

The present invention offer the directing function of search condition freely to users of a client terminal without preparing the many hypertext source for defining screen each case concerning to the search condition etc. correspondingly to various kinds.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

We claim:

1. A database searching system, comprising:
   a database having tables comprised of fields;
   a client;
   a server sending hypertext defining a screen for a database search and containing database information relating to a plurality of fields in a plurality of relationally linked tables, search condition information defining search contents that can be searched, and editing information that enables a client to edit the search condition, receiving from the client search direction information based on the search information, making a search sentence based on the search direction information, relationally searching the database according to the search sentence, and sending search results resulting from the search; and said client receives the hypertext sent by the server, makes the search direction information by selecting database fields with graphical controls based on the editing information, and sends the search direction information to the server, wherein the database is a relational database further comprising an intermediate table having information interrelating tables having one of direct and indirect common fields, the intermediate table being used to make the search sentences.

2. A system as recited in claim 1, wherein the search direction information comprises:

item information reflective of whether each item included in the database information and the search information is to be a search item;

a list item condition of the search result reflective of whether to display the search results with the list item; and sort condition information reflective of whether the search result is to be sorted when displayed.

3. A method for searching a database in a system comprising plural terminals connected through a network, comprising:

receiving by a terminal A a screen directing a relational search from another terminal B, and receiving by the terminal B a search direction from the terminal A to search a database, and sending a search result to the terminal A; and at the terminal A, creating the search direction based on a hypertext screen containing search information defining search contents that can be searched, and database information relating to a plurality of fields in a plurality of relationally linked tables, and editing information comprising information that enables a client to edit the search contents;

sending the search direction to the terminal B; and at the terminal B, creating automatically a search sentence for relationally querying the database using the search information, the database information, and information interrelating tables in the database, wherein the database is a relational database comprised of the plurality of tables and an intermediate table containing the information interrelating the plurality of tables, which tables have one of direct and indirect common fields, the terminal A is a client terminal and the terminal B is a server, and the screen sent from the terminal B to the terminal A is hypertext for a browser, and the server creates the search sentence based on the search information, the database information, and the interrelating information in the intermediate table.

4. A memory medium storing a program implemented in a server of a system for searching a database by a browser based on hypertext, the program comprising:

a process sending database information of a relational search object, comprising database information relating to a plurality of fields in a plurality of relationally linked tables, search information defining search contents that can be searched, and editing information comprising information that enables a client to edit the search contents, in hypertext for defining a screen of a database relational search stored in advance to the client terminal by a search direction; and a process automatically generating a database relational search sentence based on the information described in the hypertext by the request of the search direction of client terminal, and outputting a search result of the database generated by the database relational search sentence to the client terminal making the request, wherein the server further comprises an intermediate table having information interrelating the plurality of tables, which have one of direct and indirect common fields, and the intermediate table being used to make the search sentences.

5. A memory medium storing a program implemented in a server of a system for searching a database by a browser based on hypertext, the program comprising:

a process sending database information of a relational search object, comprising database information relating to a plurality of fields in a plurality of relationally linked tables, search information defining search contents that can be searched, and editing information comprising information that enables a client to edit the search contents, in hypertext for defining a screen of a database relational search stored in advance to the client terminal by a search direction; and a process automatically generating a database relational search sentence based on the information described in the hypertext by the request of the search direction of client terminal, and outputting a search result of the database generated by the database relational search sentence to the client terminal making the request, wherein the server further comprises an intermediate table having information interrelating the plurality of tables, which have one of direct and indirect common fields, and where the intermediate table is used to automatically make the search sentences that implement relational queries.

6. A memory medium storing a program implemented in a server of a system for searching a database by a browser based on hypertext, the program comprising:

a process sending database information of a relational search object, comprising database information relating to a plurality of fields in a plurality of relationally linked tables, search information defining search contents that can be searched, and editing information comprising information that enables a client to edit the search contents, in hypertext for defining a screen of a database relational search stored in advance to the client terminal by a search direction; and a process automatically generating a database relational search sentence based on the information described in the hypertext by the request of the search direction of client terminal, and outputting a search result of the database generated by the database relational search sentence to the client terminal making the request, wherein the server further comprises an intermediate table having information interrelating the plurality of tables, which have one of direct and indirect common fields, and where the intermediate table is used to make the search sentence for relationally querying the database.

* * * * *